United States Patent
Staton et al.

(10) Patent No.: US 10,429,214 B2
(45) Date of Patent: Oct. 1, 2019

(54) MODULAR ELONGATED WALL-MOUNTED SENSOR SYSTEM AND METHOD

(71) Applicant: NEWTONOID TECHNOLOGIES, L.L.C., Liberty, MO (US)

(72) Inventors: Fielding B. Staton, Liberty, MO (US); David Strumpf, Columbia, MO (US)

(73) Assignee: Newtonoid Technologies, L.L.C., Liberty, MO (US)

( * ) Notice: Subject to any disclaimer, the term of this patent is extended or adjusted under 35 U.S.C. 154(b) by 0 days.

(21) Appl. No.: 15/914,478

(22) Filed: Mar. 7, 2018

(65) Prior Publication Data

US 2018/0259373 A1   Sep. 13, 2018

Related U.S. Application Data

(60) Provisional application No. 62/468,200, filed on Mar. 7, 2017.

(51) Int. Cl.
| | |
|---|---|
| *G01D 11/24* | (2006.01) |
| *G01S 7/481* | (2006.01) |
| *G01D 11/30* | (2006.01) |
| *G01K 1/14* | (2006.01) |
| *G01K 1/02* | (2006.01) |

(52) U.S. Cl.
CPC ........... *G01D 11/245* (2013.01); *G01D 11/30* (2013.01); *G01S 7/4813* (2013.01); *G01K 1/024* (2013.01); *G01K 1/14* (2013.01); *G01K 2201/00* (2013.01)

(58) Field of Classification Search
CPC ........ G01D 11/245; G01D 11/30; G01K 1/14; G01S 7/4813

USPC ............................................................ 73/431
See application file for complete search history.

(56) References Cited

U.S. PATENT DOCUMENTS

| | | | |
|---|---|---|---|
| 4,467,156 A | * | 8/1984 | Dvorak ................. H01H 35/18 |
| | | | 200/84 R |
| 4,770,916 A | | 9/1988 | Leukel |
| 4,860,851 A | | 8/1989 | Krevor et al. |

(Continued)

FOREIGN PATENT DOCUMENTS

| | | |
|---|---|---|
| DE | 10315241 A1 | 9/2004 |
| EP | 1282092 A2 | 2/2003 |
| EP | 2015079 A1 | 1/2009 |

OTHER PUBLICATIONS

PCT Application No. PCT/US18/21308, International Search Report and Written Opinion, dated Aug. 9, 2018, 14 pages.

(Continued)

*Primary Examiner* — Nathaniel T Woodward
(74) *Attorney, Agent, or Firm* — Lathrop Gage L.L.P.

(57) ABSTRACT

Sensor-mounting devices are disclosed. A sensor mounting device has a tubular body having a front end, a rear end, and a through hole that extends between the front and rear ends. The tubular body front end includes a flange with a perimeter that is larger than a perimeter of the tubular body. The flange may be positioned at a front face of a mounting structure. A sensor-attachment structure is located on at least one of the tubular body and the front flange. Further locking structure extends from the tubular body to couple the tubular body to the mounting structure. The locking structure is at least one item from the group consisting of: a rear flange, a barb, and threading.

24 Claims, 12 Drawing Sheets

(56) References Cited

U.S. PATENT DOCUMENTS

| | | | | | |
|---|---|---|---|---|---|
| 5,042,300 | A | * | 8/1991 | Benjey | F01M 11/12 200/84 C |
| 5,083,115 | A | * | 1/1992 | Kamiya | G01F 23/303 340/624 |
| 5,318,363 | A | * | 6/1994 | Mauric | G01K 1/14 174/70 R |
| 5,343,747 | A | * | 9/1994 | Rosen | G01N 25/56 165/223 |
| 5,537,950 | A | * | 7/1996 | Ou-Yang | G01K 11/06 116/217 |
| 5,709,475 | A | * | 1/1998 | Stoor | G01K 1/14 374/141 |
| 6,195,013 | B1 | * | 2/2001 | Robinson | G01F 23/74 116/228 |
| 6,386,545 | B1 | * | 5/2002 | Evans | F16J 13/02 277/336 |
| 9,371,669 | B2 | | 6/2016 | Berg et al. | |
| 9,759,286 | B1 | | 9/2017 | Staton et al. | |
| 2004/0200278 | A1 | * | 10/2004 | Gansebom | H01H 36/02 73/305 |
| 2005/0094702 | A1 | | 5/2005 | Beck | |
| 2005/0155408 | A1 | * | 7/2005 | Weyl | G01K 1/14 73/23.31 |
| 2005/0224659 | A1 | | 10/2005 | Pitt | |
| 2006/0215731 | A1 | * | 9/2006 | Gadonniex | G01K 1/16 374/208 |
| 2006/0253942 | A1 | | 11/2006 | Barrera et al. | |
| 2007/0074582 | A1 | | 4/2007 | Santos et al. | |
| 2007/0125181 | A1 | | 6/2007 | Ofek et al. | |
| 2007/0138583 | A1 | | 6/2007 | Ofek et al. | |
| 2007/0171058 | A1 | | 7/2007 | Knowles | |
| 2008/0139722 | A1 | | 6/2008 | Shefelbine et al. | |
| 2008/0209825 | A1 | | 9/2008 | Smith | |
| 2009/0050428 | A1 | | 2/2009 | Kloucek et al. | |
| 2009/0121872 | A1 | | 5/2009 | Lynch et al. | |
| 2009/0147824 | A1 | * | 6/2009 | Schafer | G01K 5/18 374/183 |
| 2009/0314081 | A1 | | 12/2009 | Markus | |
| 2009/0326140 | A1 | | 12/2009 | Shimada et al. | |
| 2010/0089772 | A1 | | 4/2010 | Deshusses et al. | |
| 2010/0108306 | A1 | | 5/2010 | Cooper | |
| 2010/0210745 | A1 | | 8/2010 | McDaniel | |
| 2011/0051775 | A1 | | 3/2011 | Ivanov et al. | |
| 2011/0062820 | A1 | | 3/2011 | Aoyagi et al. | |
| 2011/0083521 | A1 | * | 4/2011 | Hollander | H04Q 9/00 73/866.5 |
| 2011/0146425 | A1 | * | 6/2011 | Furey | G01D 11/245 73/866.5 |
| 2011/0171137 | A1 | | 7/2011 | Patolsky et al. | |
| 2011/0214357 | A1 | | 9/2011 | Ewing | |
| 2011/0224942 | A1 | * | 9/2011 | Kidwell | G01K 17/00 702/136 |
| 2011/0242941 | A1 | | 10/2011 | Tsuzuki et al. | |
| 2012/0291373 | A1 | | 11/2012 | Ewing | |
| 2013/0328440 | A1 | | 12/2013 | Kornbluh et al. | |
| 2013/0340516 | A1 | * | 12/2013 | Hettle | B60C 23/0408 73/146.8 |
| 2014/0266967 | A1 | | 9/2014 | Ramahi et al. | |
| 2015/0259923 | A1 | | 9/2015 | Sleeman | |
| 2015/0316497 | A1 | * | 11/2015 | Chang | G01N 33/246 73/73 |
| 2016/0040743 | A1 | | 2/2016 | Staton | |
| 2016/0061799 | A1 | * | 3/2016 | Epperson | G01K 13/02 702/50 |
| 2016/0363727 | A1 | | 12/2016 | Suntsova et al. | |

OTHER PUBLICATIONS

PCT application No. PCT/US2017/057257, International Search Report and Written Opinion, dated Feb. 16, 2018, 11 pages.

Bivar, Inc. Light Pipes (www.bivar.com/led-indication/light-pipes).

Phys. Org. New Polymer That changes Color Instantly in Response to External Magnetic Field (w/ video, https://phys.org/news/2009-06-polymer-instantly-response-external-magnetic.html, dated Jun. 16, 2009, 4 pages.

Tomick et al. Vibration-Powered Wireless Sensor for Structural Monitoring During Earthquakes. The 6th International Conference on Structural Health Monitoring of Intelligent Infrastructure, Dec. 11, 2013 (retrieved on Feb. 25, 2018) Retrieved from the Internet <URL; http:ecs.victoria.ac.nz/foswiki/pub/Groups/WiNe/ResearchPublications/1215_VUWSeah_v3-1.pdf> entire document.

PCT Application No. PCT/US2017/068928, International Search Report and Written Opinion, dated Mar. 26, 2018, 1-pages.

* cited by examiner

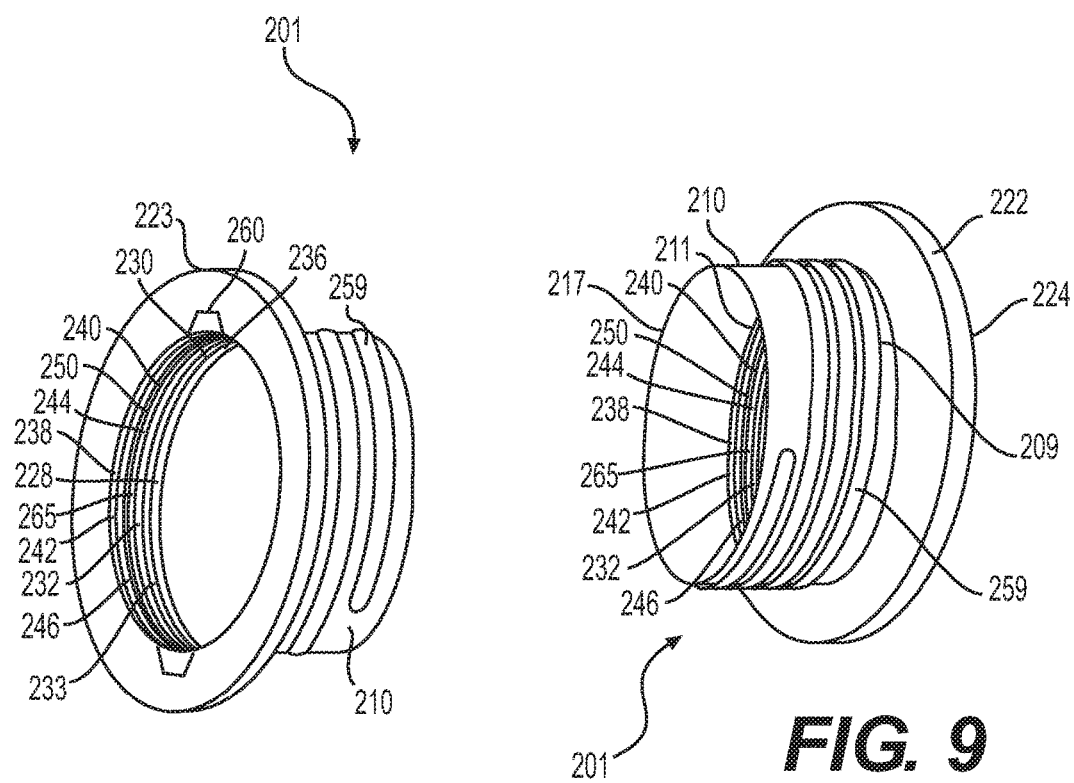
FIG. 8
FIG. 9
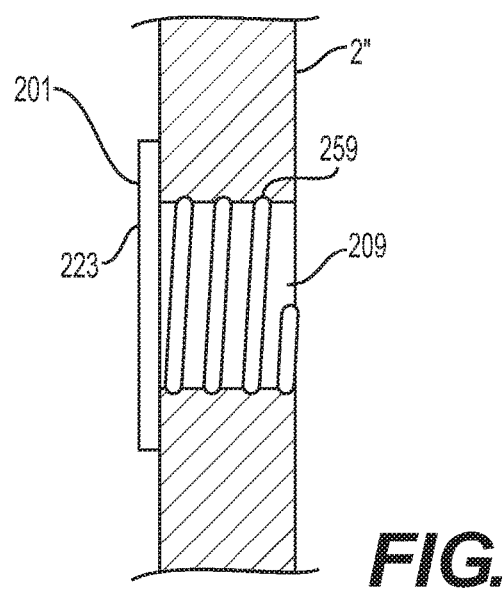
FIG. 10

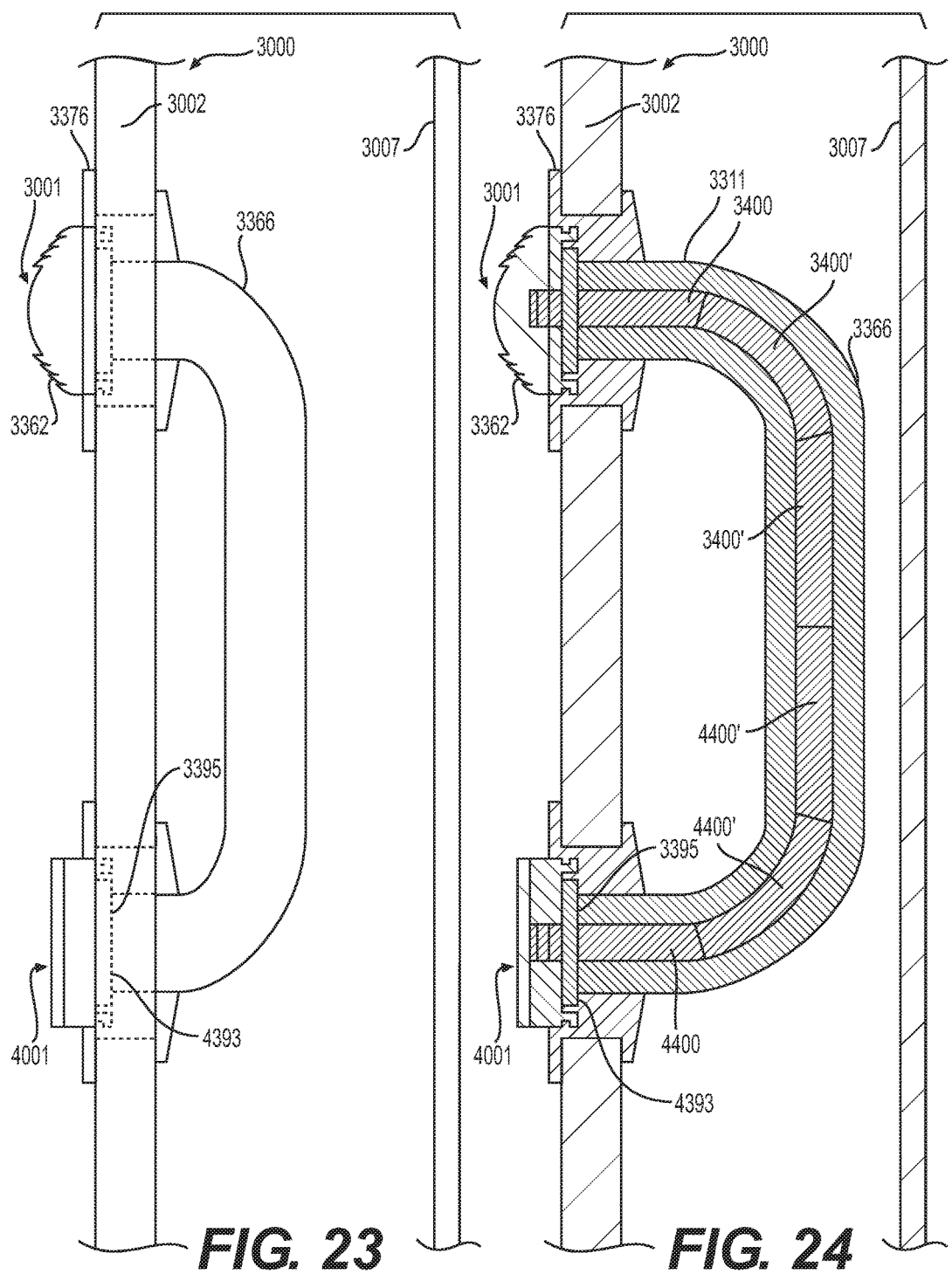

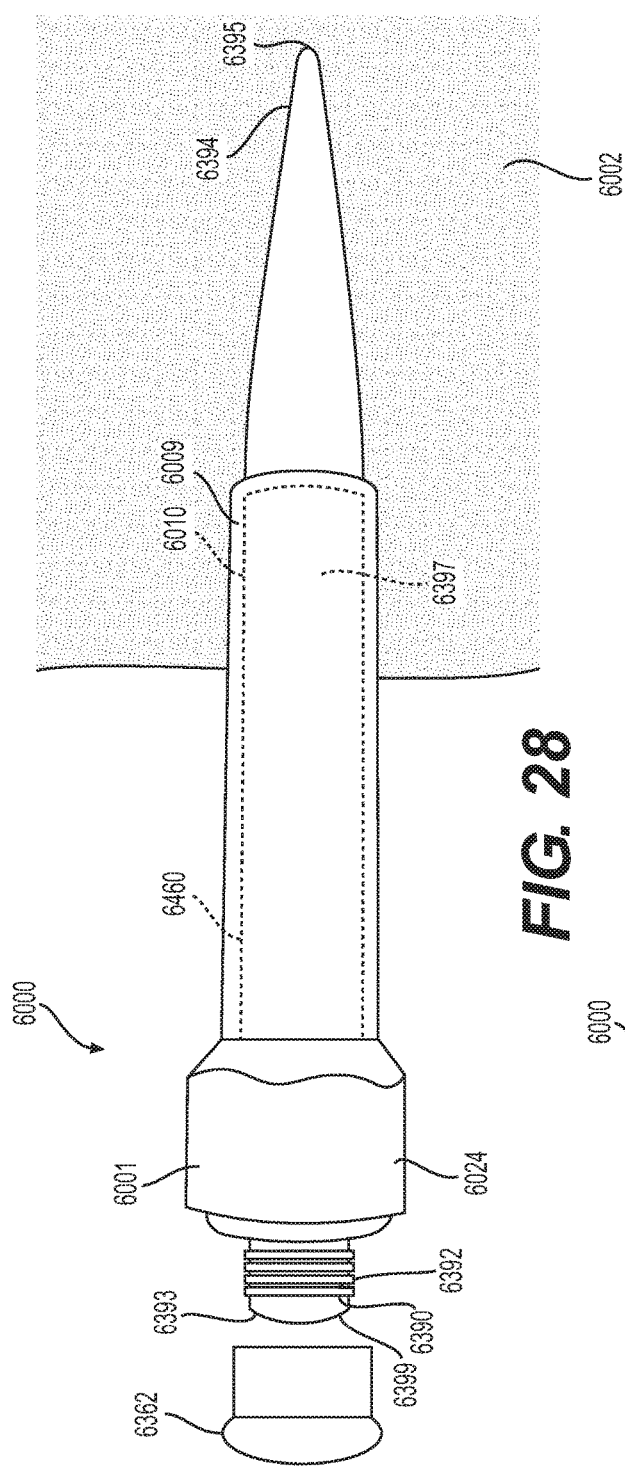
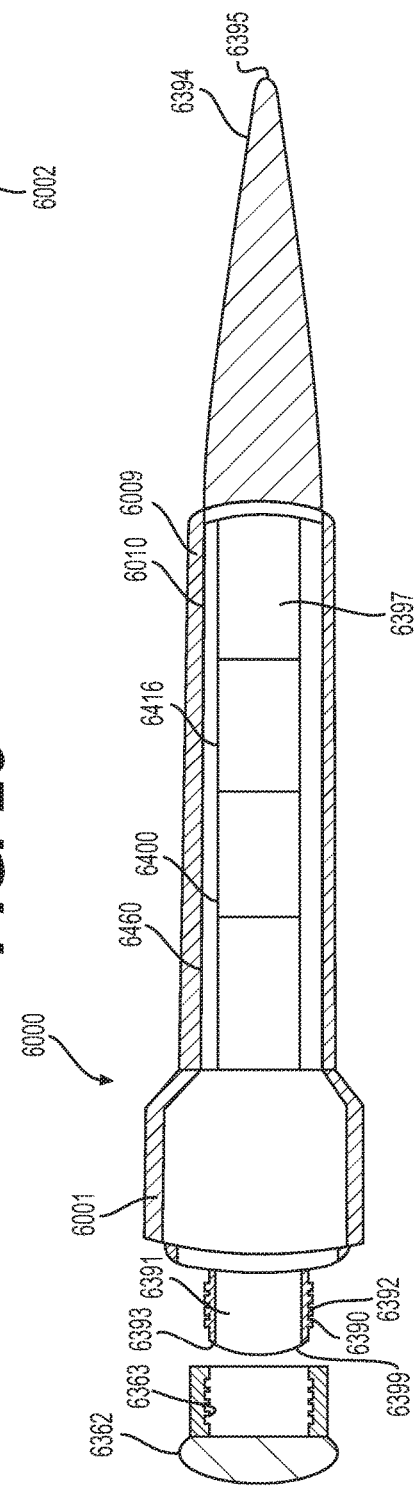
FIG. 28
FIG. 29

MODULAR ELONGATED WALL-MOUNTED SENSOR SYSTEM AND METHOD

CROSS-REFERENCE TO RELATED APPLICATIONS

This application claims priority to U.S. Provisional Patent Application No. 62/468,200, filed Mar. 7, 2017 and entitled "Modular Elongate Wall-Mounted Sensor System and Method", the entirety of which is incorporated herein by reference.

BACKGROUND

The present disclosure relates to wall-mounted sensor devices and methods for installing the wall-mounted sensor devices. Some of the wall-mounted sensors are modular and allow for modules or sensors to be added to a main unit to increase functionality.

Sensors of all types are used in homes and commercial buildings, such as smoke detectors, motion detectors, cameras, humidity detectors, barometric pressure sensors, carbon monoxide detectors, magnetic fields, and temperature sensors. Conventional thermostats incorporate temperature sensors and are configured for one-way communication with connected components, such as components in the HVAC system to regulate flow of air. Typically, a single sensor connection only accomplishes a single task (e.g., a temperature sensor for measuring temperature), and because of this, a plurality of sensors are often distributed throughout the house for the many different systems and metrics that can be observed. The sensors are often unattractive and do not communicate with each other.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

In one embodiment, a sensor-mounting device for use with a mounting structure having a hole has a tubular body having a front end, a rear end, and a through hole extending between the front and rear ends. The tubular body is sized to pass through the mounting structure hole. The tubular body front end includes a front flange with a perimeter that is larger than a perimeter of the tubular body for positioning at a front face of the mounting structure. Sensor-attachment structure is located on at least one of the tubular body and the front flange. Additionally, locking structure extends from the tubular body to couple the tubular body to the mounting structure. The locking structure is at least one item from the group consisting of: a rear flange, a barb, and threading.

In another embodiment, a method of installing a sensor-mounting device for use with a mounting structure, includes positioning the sensor-mounting device within an aperture formed in the mounting structure. The sensor-mounting device has a tubular body having a front end, a rear end, and a through hole extending between the front and rear ends. The tubular body is sized to pass through the mounting structure hole. The tubular body front end includes a front flange with a perimeter that is larger than a perimeter of the tubular body for positioning at a front face of the mounting structure. Sensor-attachment structure is located on at least one of the tubular body and the front flange. Additionally, locking structure extends from the tubular body to couple the tubular body to the mounting structure. The locking structure is at least one item from the group consisting of: a rear flange, a barb, and threading.

In still another embodiment, a sensor-mounting device has a tubular body having a front end, a rear end, and a through hole extending between the front and rear ends. A front flange at the tubular body front end has a perimeter that is larger than a perimeter of the tubular body. Sensor-attachment structure is located on at least one of the tubular body and the front flange. Additionally, locking structure extends from the tubular body. The locking structure is at least one item from the group consisting of: a rear flange, a barb, and threading.

In still yet another embodiment, a sensor-mounting device has a tubular body having a first end, a second end, and a through hole extending between the first and second ends. The first and second ends have respective front flanges, each flange having a perimeter that is larger than a perimeter of the tubular body. A sensor-attachment structure is located on at least one of the tubular body and the front flange of each of the respective first and second ends. Further, locking structure extends from the tubular body at each of the respective first and second ends, the locking structure being at least one item from the group consisting of: a rear flange, a barb, and threading. The tubular body is non-linear such that the first and second ends are received into respective apertures formed in a mounting surface.

BRIEF DESCRIPTION OF THE DRAWINGS

The drawings constitute a part of this specification and may include exemplary embodiments of the present invention and illustrate various objects and features thereof. A further understanding of the invention may thus be had by reference to the accompanying drawings.

FIG. 8 is a front perspective view of a sensor-mounting device in a third embodiment according the present disclosure.

FIG. 9 is a back perspective view of the sensor-mounting device of FIG. 8.

FIG. 10 is a side view of the sensor-mounting device of FIG. 8 installed into a mounting structure.

FIG. 23 is a side view of a modular sensor-mounting system in a second embodiment according to the present disclosure.

FIG. 24 is a cross section view of the modular sensor-mounting system of FIG. 23 in use within a wall.

FIG. 28 is a side view of a modular sensor-mounting system in a fourth embodiment according to the present disclosure within a ground surface.

FIG. 29 is a cross section view of the modular sensor-mounting system of FIG. 28.

DETAILED DESCRIPTION

Described herein are embodiments of extended remote access sensor-mounting systems and devices designed to provide and/or make use of optical power, optical bidirectional data, auditory information, electrical power, electrical bidirectional data, vibrational information data, radio frequency data, etc. Sensors located at or near a mounting surface may communicate with hardware located in the mounting device, which may be remote to the sensor (e.g., located in a housing remote from the sensor). Alternately, access portals (e.g., air intake holes) located at or near a mounting surface may allow, for example, gasses to enter into and/or exit from the sensor-mounting device, the sensor being housed in a housing remote (e.g., behind the mounting surface) from the access portal. As will be further understood from the description provided herein, the extended remote access sensor-mounting device allows for increased flexibility to sense and provide controlled responses in areas that might not otherwise have been thought to be ideal for such purposes (e.g., around corners, behind walls, inside sealed or unsealed enclosures, etc.) The system allows for real-word interfacing in real-time based on human and/or environmental stimulus. Sensors can be permanently affixed in a desired location as well as attached to automated migrating remote accessories (e.g., telescopic poles, windows, doors, motorized tracks, drones, et cetera). The distributed functionality of the sensors allow analysis and selected actuation response of measurable information that can be derived through means of discrete sensor components as well as information that could be derived through properties of the housing material itself (e.g. Graphene, moldable ceramics and crystals, conductive rubber, silicon substrates, et cetera).

Figure 1:
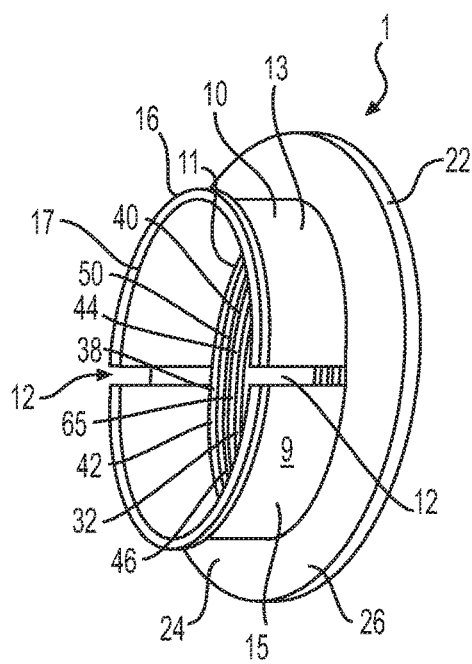
FIG. 1 is a back perspective view of a sensor-mounting device according to an embodiment of the present disclosure.
Figure 2:
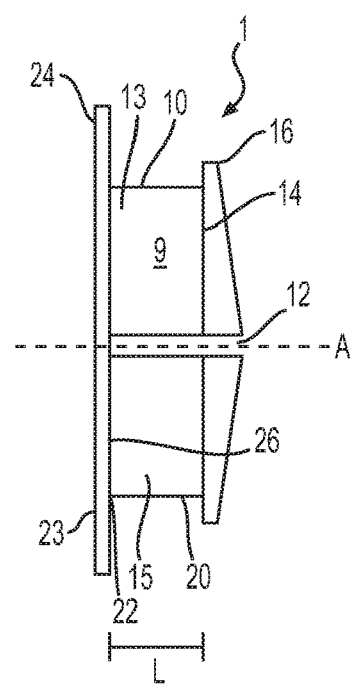
FIG. 2 is a side view of the sensor-mounting device of FIG. 1.
Figure 3:
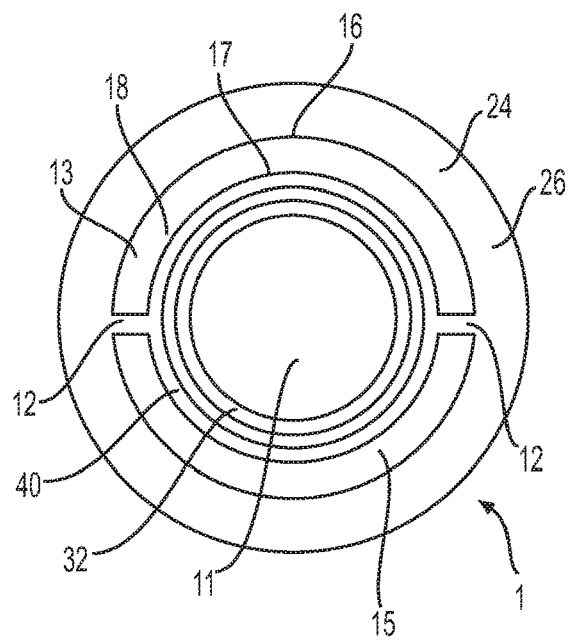
FIG. 3 is a front view of the sensor-mounting device of FIG. 1.
Figure 4:
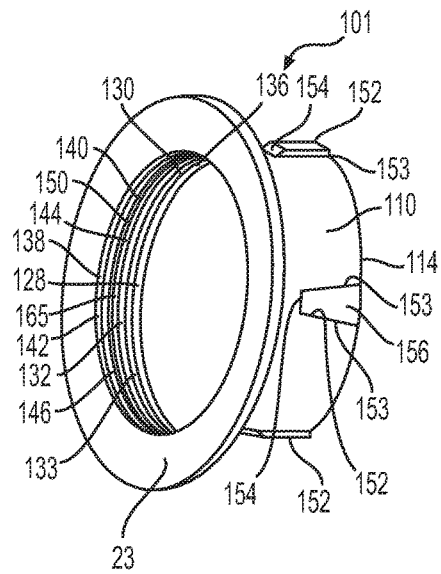
FIG. 4 is a front perspective view of a sensor-mounting device in a second embodiment according the present disclosure.
Figure 5:
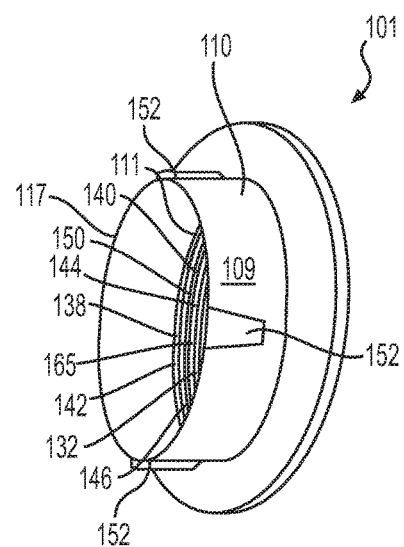
FIG. 5 is a back perspective view of the sensor-mounting device of FIG. 4
Figure 11:
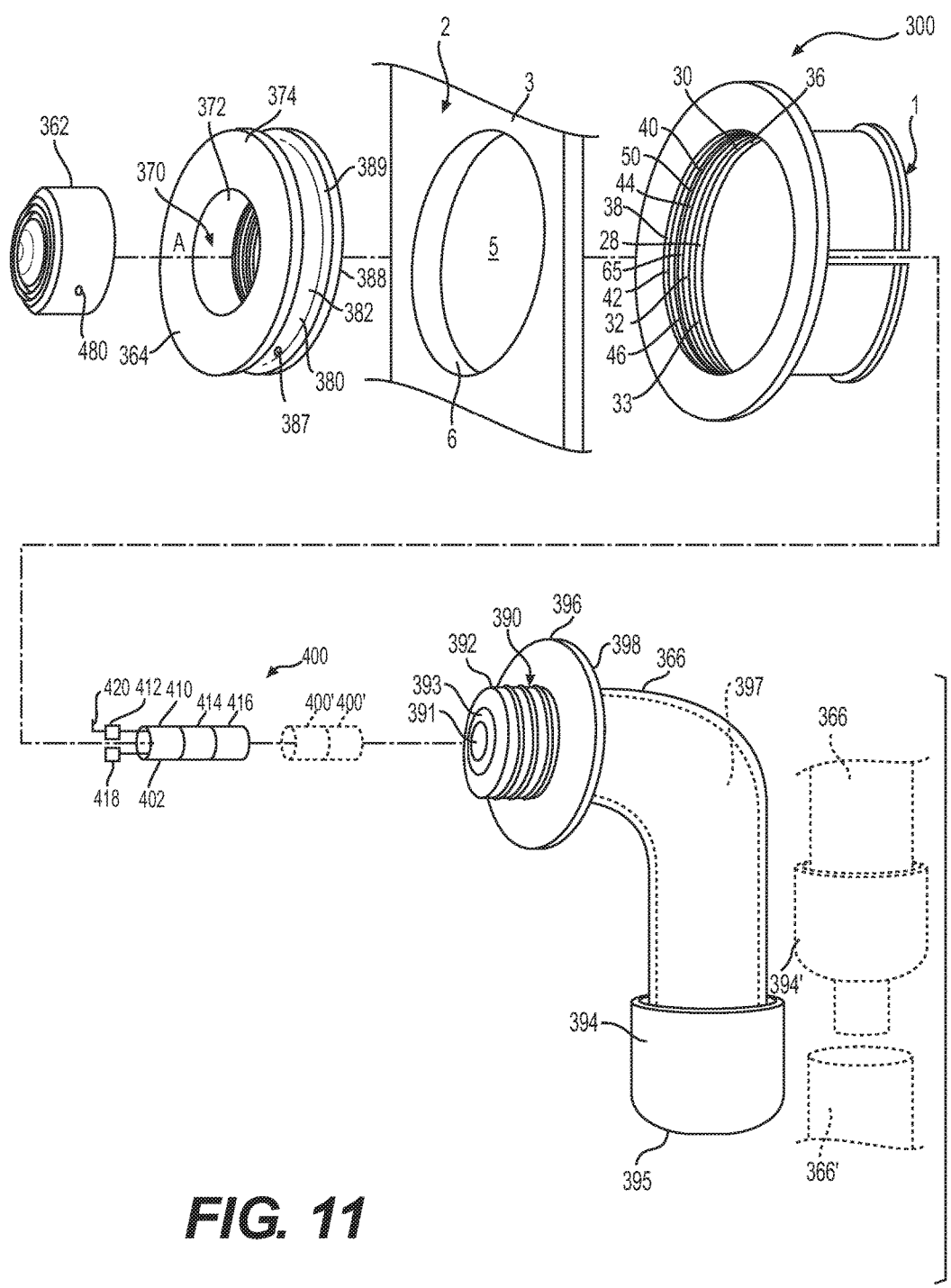
FIG. 11 is an exploded view of a modular sensor-mounting system according to the present disclosure.
Figure 12:
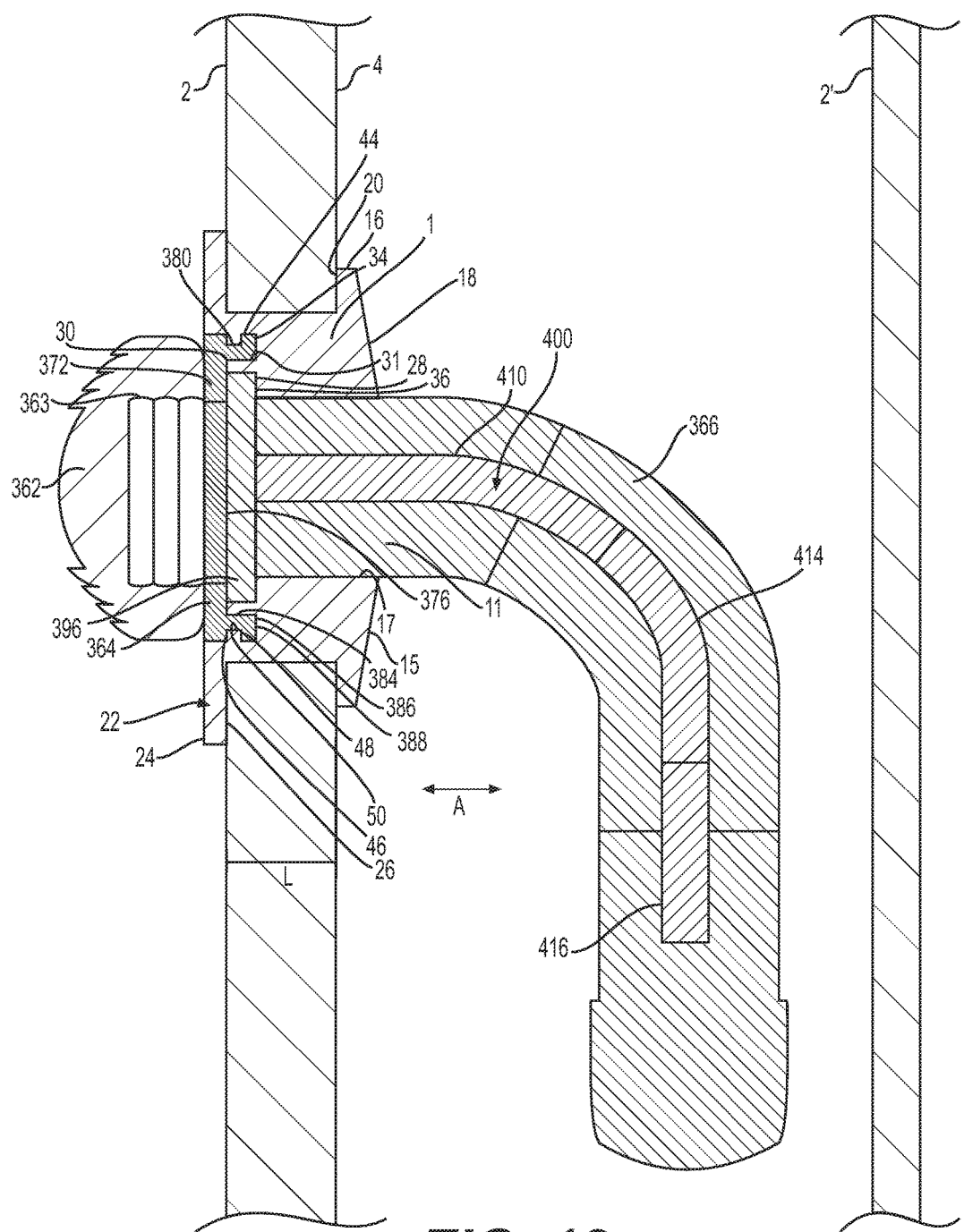
FIG. 12 is a cross section view of the modular sensor-mounting system of FIG. 11 in use within a wall.
Figure 13:
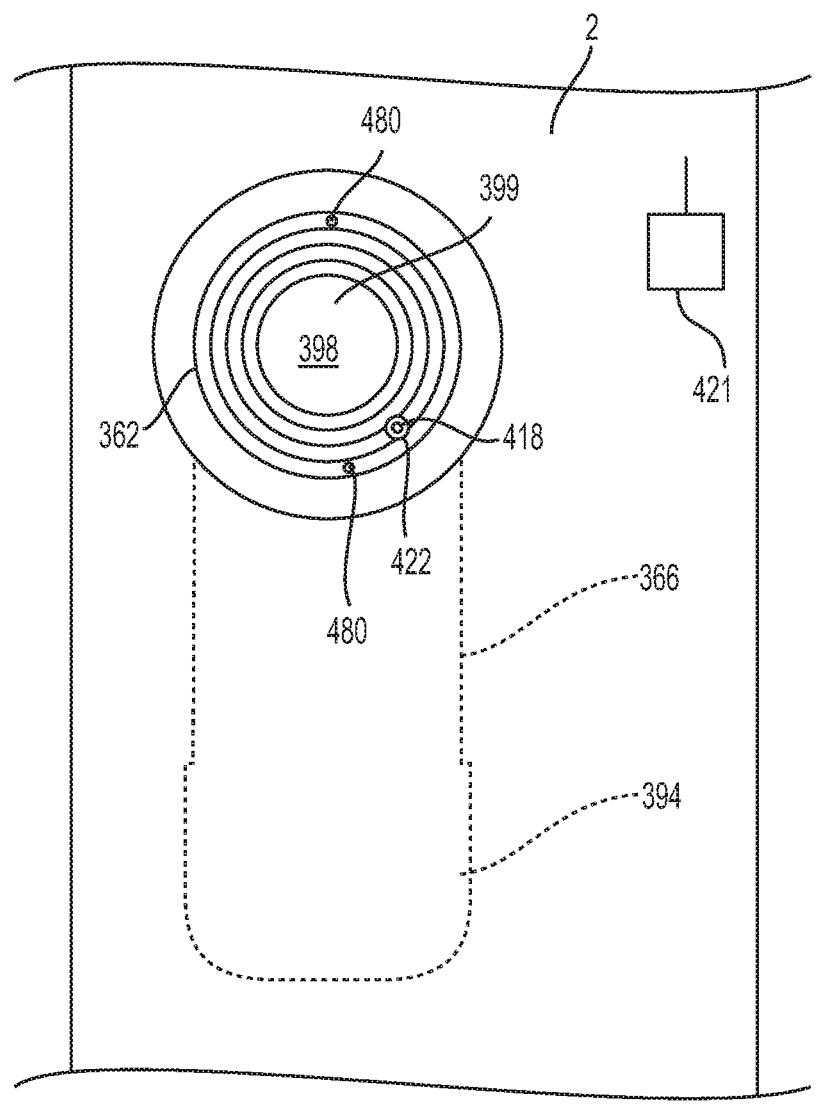
FIG. 13 is a front view of the modular sensor-mounting system of FIG. 11 within a wall with portions cut away and portions shown in phantom.

FIGS. 1-3 illustrate a sensor-mounting device 1 adapted to be mounted on a mounting structure or wall 2 (FIGS. 11-13). The sensor-mounting device 1 may be made from one or more materials including but not limited to metal (e.g., aluminum, brass, copper, steel, tin, nickel, titanium, et cetera), plastic (e.g., bakelite, polystyrene, polyvinyl, nylon, silicone, epoxy, et cetera), rubber (synthetic or natural), or other appropriate materials.

The sensor-mounting device 1 is illustrated as tubular shaped in a longitudinal direction A with a circular body 10. Nevertheless, the body 10 may be other geometrical shapes, such as square, rectangular, oval, et cetera. The body 10 has a central bore 11 defining an inner surface 17 in the longitudinal direction A.

The body 10 may have expansion grooves 12 in the longitudinal direction A on at least one side of the body 10, creating an upper portion 13 and a lower portion 15, which would allow for some compression of the upper and lower portions 13 and 15, respectively, of the body 10 during installation onto the mounting structure 2.

At a rear end 14 of the body 10 is a rear flange 16. The rear flange 16 may be substantially circular shaped with a larger diameter than the body 10. It is foreseen that the rear flange 16 may be other geometrical shapes, such as square, rectangular, oval, et cetera. In the illustrated embodiment, the rear flange 16 tapers from the grooves 12 toward a front end 22 of the body 10. In other embodiments, the rear end 14 and the rear flange 16 may be generally parallel with the front end 22.

At the front end 22 of the body 10 is a front flange 24 having a back surface 26 (FIG. 1) for positioning against a front surface 3 of the wall 2 (FIG. 11). The front flange 24 is illustrated to be circularly shaped with a larger diameter than the rear flange 16, though it is foreseen that the front flange 24 may be other geometrical shapes, such as square, rectangular, oval, et cetera. In some embodiments, the front flange 24 is visible when installed; in other embodiments, the front flange 24 is sufficiently thin such that once installed in a wall, it is either taped and/or mudded over before being painted. The front flange 24 may be only slightly larger than the body 10 or it may be substantially greater in diameter (e.g., one inch in diameter or more) dependent upon the size of the hole in the mounting structure 2 in to which the body 10 is inserted and the desired aesthetics. It shall be understood by those of skill in the art that sensors, including but not limited to the sensors described herein, are becoming increasingly small. It is contemplated within the scope of the invention that the mounting device 1 may be manufactured having dimensions which correspond to the sensors, and therefore the diameter of the body 10 may be a small as, for example, ¼", with the respective flanges 24 and 16 having diameters that are slightly greater than the diameter of the body 10.

A length L (FIGS. 2 and 12) of the body 10 between the first and second flanges 16 and 24, respectively, may be substantially equivalent to the wall thickness in which it is to be installed, such as ⅜ inch or ½ inch. Accordingly, it shall be understood that the sensor-mounting device 1 may come in various sizes from small to large and the body 10 may come in varying lengths to accommodate different thickness of mounting structures 2 (e.g., drywall, paneling, et cetera).

A radial stop surface 28 (FIG. 11) may be located along the central bore 11, substantially perpendicular to the inner surface 17. The stop surface 28 may be long enough to interact with and limit travel of a pipe fitting 366 and a locking ring 364 (FIG. 12), as will be further discussed below. Adjacent the stop surface 28 is a radial projection 30. The projection 30 runs outward in the longitudinal direction A and has a top surface 31 and a bottom surface 33. The projection 30 has an end surface 32 that may also act as a stop for the locking ring 364, as will be further discussed below. The projection 30 may split the stop surface 28 into two portions, an upper portion 34 and a lower portion 36, with the lower portion 36 being directly adjacent the inner surface 17 of the central bore 11. It is foreseen that the upper and lower portions 34, 36 may be substantially similar or dissimilar in length dependent upon the location of the projection 30.

Adjacent and running substantially perpendicular to the upper portion 34 of the radial stop surface 28 is a radial second inner surface 38. A second radial projection 40 running substantially perpendicular to the longitudinal direction A may split the second inner surface 38 into an outer portion 42 and an inner portion 44. The inner and outer portions 42, 44 may be substantially similar or dissimilar in length dependent upon the location of the projection 40. The projection 40 has a front surface 46, a back surface 48, and an end surface 50, each of which may interact with a radial groove or recess 65 of the locking pin or ring 364, as will be further described below.

Figure 6:
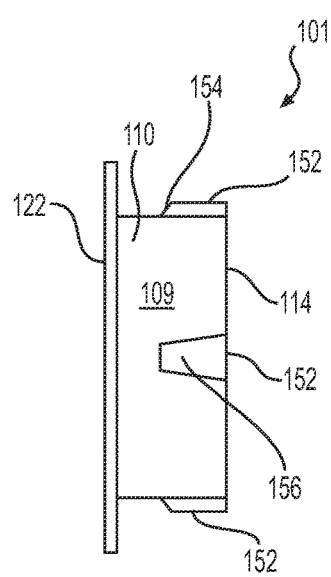
FIG. 6 is a side view of the sensor-mounting device of FIG. 4 in a pre-installed or process of being installed configuration.
Figure 7:
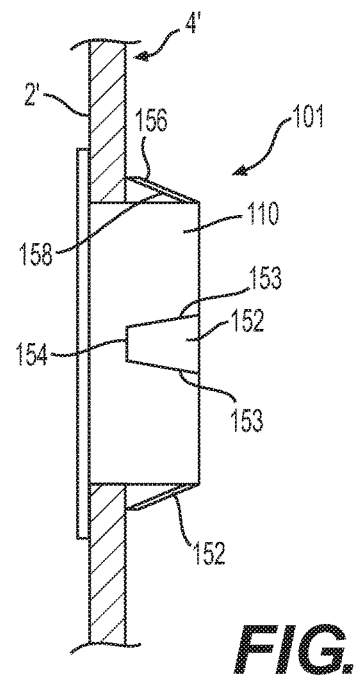
FIG. 7 is a side view of the sensor-mounting device of FIG. 4 in the installed configuration into a mounting structure.

FIGS. 4-7 illustrate an alternative sensor-mounting device 101 adapted to be mounted through a mounting structure 2'. The sensor-mounting device 101 is substantially similar to the sensor-mounting device 1 as discussed above, with the exception of the sensor-mounting body 110. Here, the sensor-mounting body 110 does not include the flange 16, but is instead is illustrated as having four wings (or "barbs") 152 on a first end 114. The wings 152 may open from between approximately zero degrees to substantially 90 degrees relative to the outer surface 109 of the body 110. In other words, the wings 152 may be initially substantially flat against an outer surface 109 of the body 110, as shown in FIG. 6. As illustrated in FIG. 7, once the body 110 is installed on the mounting structure 2', the wings 152 may open up to brace the sensor-mounting device 101 against a back surface 4' of the wall 2', thereby holding the device 101 securely against the mounting structure 2'. Here, the wings 152 are shown as being opened at an angle of approximately 20 degrees. The body 110 may be longer than the length L of body 10 to allow for the wings 152 to catch against the back surface 4' of the mounting structure 2'. Further, the wings 152 may have a length less than the length of the body 110.

The wings 152 may be spring loaded or otherwise automatically biased such that once the wings 152 pass through a hole in the mounting structure 2', they automatically open. The wings 152 may have outer edge surfaces 153 which may optionally be angled toward an end surface 154, and respective top and bottom surfaces 156 and 158. The bottom surface 158 may be longer than the top surface 156, and the end surface 154 may slant from the bottom surface 158 to the top surface 156, thereby creating a point to better secure against the back surface 4' of the wall 2'. In some embodiments, the bottom surface 158 may be the sole surface to interact with the back surface 4' of the wall 2'.

The wings 152 are illustrated as being substantially similar to each other. However, it is foreseen that the wings 152 may not all be the same—for example, the top and bottom wings may be longer than the side wings.

FIGS. 8-10 illustrate a sensor-mounting device 201 adapted to be mounted through a wall or mounting structure 2". The sensor-mounting device 201 is substantially similar to the sensor-mounting devices 1 and 101 as discussed above, with the exception of the outer surface 209 of the sensor-mounting body 210 being coarse threaded with threads 259. The sensor-mounting device 201 is meant to be screwed into a mounting surface 2". In the illustrated embodiment, tool engaging grooves 260 are located on a second end surface 223 of the sensor-mounting device 201.

Referring now to FIGS. 11-13, a sensor-mounting system 300 is illustrated. The sensor-mounting devices 1, 101, and 201 are each adapted to be mounted through a wall or mounting structure 2 having an aperture 5. For illustrative purposes only, reference is hereinafter made to the use of the sensor-mounting device 1 though it shall be understood by those of skill in the art that sensor mounting device 101 and/or 201 may additionally or alternately be used. The mounting structure 2 may be sheetrock (drywall), paneling, an automobile door, aircraft/boat inner walling, speaker housing, doorway, window frame, et cetera. The sensor-mounting system 300 may either be installed on a pre-existing wall 2 as shown in FIG. 13, or may be set up at the framing stage of a structure with the sensor-mounting system 300 being in wired communication with a box (e.g., an electrical box).

In FIG. 11, the sensor-mounting system 300 includes the sensor mount 1, a sensor head 362, a locking ring 364, the sensor-mounting device 1, a sensor 400, and a pipe coupling, fitting, or connector 366.

The locking ring 364 is a circular ring with a front surface 374, a back surface 376, and a central bore 370 oriented in the longitudinal direction A. The central bore 370 defines an inner surface 372. A radial projection 380 having a top surface 382, a bottom surface 384, and an end 386 may extend outward from the back surface 376. The bottom surface 384 may mate with the inner surface 372 of the locking ring bore 370. At end 386 may be a radial lip 388, with the lip 388 extending generally perpendicular to the projection 380.

The end surface 50 and the back surface 48 of the projection 40, the inner portion 44 of the second inner surface 38, the upper portion 34 of the stop surface 28, and the top surface 31 and the end surface 32 of the projection 30 in combination create a recess 65 in which the lip 388 of the locking ring 364 may be seated. A top portion of the back surface 376, the top surface 382 of the projection 380, and an inner surface 389 of the radial lip 388 all combine to make up a recess 387 in which the projection 40 may be seated. The inner surface 389 of the lip 388 hooks and interlocks with the back surface 48 of the projection 40. With the locking ring 364 in place, the pipe fitting 366 and sensor head 362 may be captured into position. The locking ring 364 limits or restricts motion of the sensor head 362 and the pipe fitting 366 in the longitudinal direction A.

The locking ring 364 may be made from or more materials including but not limited to metal (e.g., aluminum, brass, copper, steel, tin, nickel, titanium, et cetera), plastic (e.g., bakelite, polystyrene, polyvinyl, nylon, silicone, epoxy, et cetera), rubber (synthetic or natural), or other appropriate materials. It may be advantageous to make the locking ring 364 out of an elastic material, as elasticity may make the installation and removal into the sensor-mounting device 1, 101, and/or 201 easier.

The pipe fitting 366 includes a coupling 392, such as a liquid-tight coupling on a first end 393 and a cap 394 on a second end 395 to seal off the second end 395. The pipe fitting 366 further has a central bore 397 therethrough. In another embodiment, the second end 395 may include a coupling means 394', such as compression, soldering, pressure, or crimp fitting, in lieu of an end cap 394 in order to optionally extend the pipe fitting 366 via additional pipe or conduit 366' (FIG. 11), allowing for further components of the sensor 400 to be installed within.

The pipe fitting 366 is a housing that may accommodate sensor electronics and protects the electronic components from environmental influences. In one embodiment, the pipe fitting 366 is a bent pipe. The pipe fitting 366 may be sized and shaped so as to fit within the central bore 11 of the sensor-mounting device 1. The coupling 392 has a radial circular plate 396 on a first end 398 and a threaded portion 390 extending outwardly from the circular plate 396 to form the second end 395. The coupling 392 has a central bore 391, which may be smaller than the central bore 397 of the pipe fitting 366, and configured to pass through both the plate 396 and the threaded portion 390. The coupling 392 is restricted by the stop surface 28 when the circular plate 396 engages the stop surface 28.

The pipe fitting 366 may be rigid or flexible conduit, as is well known in the art. Appropriate materials for the pipe fitting 366 may include metals (e.g., copper and steel), plastics (e.g., PVC, polycarbonate, acrylic), flexible materials, etc. The pipe 366 may further include optical transmitters such as a light pipe or fiber optic materials, as is discussed in greater detail below. It is also foreseen that the interior may be layered with an electrical protective coating or layer of plastic.

A sensor 400 for mounting into the sensor-mounting device 1 includes a microcontroller 410, a transceiver 412, memory 414, a power source 416, and one or more sensor nodes 418. Different sensors 400 and/or 400' (hereinafter collectively referred to as sensor 400) may be able to connect with the sensor-mounting device 1 in order to provide the ability to sense various desirable inputs and provide respective controlled responses as discussed below. Such connections between sensors 400, 400' may be modular.

Referring to FIG. 11, the sensor 400 is illustrated within a circular housing 402, though such housing and/or housing configuration is not required. At least part of the sensor housing 402 and related components may be situated within the pipe fitting central bore 397. The sensor 400 may be any type of sensor, such as a motion (e.g., passive infrared), temperature, humidity, vibration, magnetometer, gas (e.g., radon, carbon monoxide), barometric pressure, liquid, soil, mold, bacteria, biofilm, blood, sweat, smoke, optical or camera, light, sound (e.g., microphone) sensor, or a combination thereof.

The microcontroller 410 performs the tasks of processing the data received and controlled over the different components described below. The transceiver 412 may include a transmitter (or "antenna") 420. The antenna 420 may be situated outside the pipe fitting 366, as the pipe fitting 366 may act as a shield to RF communications. For example, the antenna 420 may be a part of circuitry located in the sensor head 362. The transceiver 412 communicates directly and/or over a wireless communication infrastructure with other devices configured to receive such wireless communication to provide controlled response(s) to inputs from the sensor 400 (e.g. display, speaker, harvested energy storage, et cetera). In direct wireless communications, the transceiver 412 may include baseband processing circuitry to convert data into a wireless signal (e.g., radio frequency (RF), infrared (IR), ultrasound, near field communication (NFC), et cetera) and the transmitter 412 transmits the wireless signal. When a second wireless transceiver 421 (FIG. 13) is within range (i.e., is close enough to the first wireless transceiver 412 to receive the wireless signal at a sufficient power level), it receives the wireless signal and converts the signal into meaningful information (e.g., voice, data, video, audio, text, instructions for completing a task, et cetera) via baseband processing circuitry (e.g., through an application on a phone, computer, notepad, etc. or through a central display located within the home). Examples of direct wireless communication (or point-to-point communication) include Bluetooth, ZigBee, Radio Frequency Identification (RFID), et cetera.

For indirect wireless communication or communication via a wireless communication infrastructure, the first wireless transceiver 412 transmits a wireless signal to a base station or access point, which conveys the signal to a wide area network (WAN) and/or to a local area network (LAN). The signal may traverse the WAN and/or LAN to a second base station or access point to send signal to the second wireless transceiver 421 or it may traverse the WAN and/or LAN directly to the second wireless transceiver. Examples of wireless communication via an infrastructure include cellular satellite/tower, IEEE 802.11, public safety systems, et cetera.

The second wireless transceiver 421 may wirelessly communicate back to the first wireless transceiver 412 in a similar manner.

The first and/or second transceiver 412 and 421, respectively, may communicate, with controlled response systems within a home, such as a window that automatically shades at a certain temperature, or blinds that automatically open or close at a certain time or temperature, or as a response to another trigger from the sensor 400. In another example, the sensor 400 may be connected to the HVAC system of the home and able to control the HVAC system based upon the temperature measurements of the sensor node 418. Additionally, or alternately, the sensor 400 may communicate with the home alarm system if, for example, motion or another trigger is detected. Further exemplary controlled response systems are described in U.S. Provisional Patent Application Nos. 62/409,609 and 62/441,127, which are incorporated by reference in their entireties herein. Those of skill in the art shall understand that the sensor 400 may be actively transmitting the signal (e.g., in real time or at predetermined intervals) or passively awaiting instructions to transmit.

The memory 414 contains the relevant computer or program instructions for the microcontroller 410, and may further include data obtained by the sensor node 418. The data may be transmitted by the transceiver 412 as described above. The memory 414 may be situated in the same circuit board as the microcontroller 410 and power source 416.

The sensor node 418 may be small in size and is the component that is measuring the particular activity being monitored (e.g., smoke, sound, vibration, temperature, light, pressure, et cetera). The sensor node 418 is shown in the sensor head 362 poking through an aperture 422 (FIG. 13). The sensor node 418 may optionally be a part of circuitry (e.g., the transceiver 412) housed in the sensor head 362. As noted above, each sensor 400 may include one or more sensor nodes 418. Each sensor node 418 may be configured to sense at least a single input and/or act as an output (e.g., LED, speaker, laser, radio frequency transceiver, etc.). For example, a first sensor node 418 within a sensor 400 may be configured to measure the temperature in the room; a second sensor node 418 may be a light sensor for determining when the sun is out; a third sensor node 418 may be a smoke detector, which may be further configured as a speaker for alerting nearby persons when smoke is detected. Additional sensor nodes 418 may be further, or alternately, be incorporated into the sensor 400 as is desirable.

Those of skill in the art will appreciate that the sensor 400 may be any sensors that is currently on the market or may be later-developed. It shall further be appreciated that the sensor 400 (e.g., via sensor nodes 418) may be configured as an input and/or output device(s) (e.g., actuator, speaker, light/LED/laser, etc.) configured for Supervisory Control and Data Acquisition applications including distributed node applications such as the Internet of Things (IoT). The sensors 400 may receive and provide information as part of a comprehensive distributed system throughout a location (or multiple locations, as the case may be). Sensors 400 may further sense harmful wave frequencies and provide controlled responses in the form of clean, healthy waves to counteract the harmful waveforms.

One or more sensors 400 (e.g., via sensor nodes 418) may be configured as a user interface as part of the distributed system. For example, the sensor(s) 400 may be in communication with various "smart systems" in a location in order to receive input (e.g., from the user) in order to effectuate a controlled response. As noted herein, the sensors 400 may be equipped nodes 418 which may include, among other things, microphones, cameras, lights, etc. In the example, the sensor 400 may have a microphone and may be configured (e.g., through programming) to recognize certain commands from a user. When a user says "set the thermostat to 72°" the sensor 400 may communicate that message to the thermostat and set the temperature accordingly. Or, a sensor 400 may detect the presence of a person in a room which causes the lights to turn on. The sensors 400 may be located at predetermined intervals (e.g., every 3' on center) to monitor the environment. As a user moves from room to room, the sensors 400 may cause the lights in each room to turn on and/or off as the case may be. Each sensor 400 distributed throughout a location may be equipped with such abilities, or the sensors 400 may be strategically placed based on their specific abilities.

The signals from various media (e.g., light, electrical waveforms, gases, fluids, radiation, etc.) may be distributed through the housing 366 (e.g., through the tube, a conduct, a light pipe, etc.) to the various systems (e.g., hardware) stored therein using time domain and/or frequency domain multiplexing. Examples of simple, low-cost network distribution methods include but are not limited to: serial data, CAN bus, LIN bus, Modbus, Inter-Integrated Circuit (I2C), Ethernet, and infrared data association protocol suite. In other words, a single signal may be transmitted using a simple wire, tube, or light pipe to power and bi-directionally communicate with the subsystems in the housing 366.

Regardless of the capabilities of the sensor 400 (e.g., the number of sensor nodes 418), the sensor 400 may be configured to engage with the sensor-mounting device 1 for securing the sensor 400 to the mounting surface 2. In this way, the sensors 400 may be exchangeable in order to provide greater (or less) functionality in the location where the sensor 400 is placed. For example, in an existing structure, certain functionalities may not be achievable due to current limitations of the structure. Consider for purposes of illustration that a sensor-mounting device 1 and corresponding sensor 400 is incorporated into a wall 2 of an existing home. At the time the device 1 and sensor 400 are installed, the HVAC system is not configured for wireless communication with the sensor 400. Accordingly, the home owner does not require a sensor 400 that measures humidity in order to communicate such information to the HVAC system such that the system takes the appropriate action in response to the information. However, at a later date, the home owner may replace the HVAC system that is configured for wireless communication with the sensor 400. The home owner may thus remove the first sensor 400 (having a number of sensor nodes 418 but not a node that measures humidity), and replace it with a second sensor 400 (having a number of sensor nodes 418, one of the sensor nodes 418 being configured to measure humidity). The second sensor 400 may fit into the sensor-mounting device 1 in the same manner as the first sensor 400. The sensor node 418 configured to measure humidity may retrieve humidity information from the atmosphere, which may be transmitted (e.g., wirelessly) to the HVAC system, which may turn off/on certain features to increase/decrease the humidity in the home. Accordingly, it is understood that further components that make up the sensor 400 may be added to provide additional sensing feature (e.g., temperature, motion, smoke, et cetera).

Wires and other component pieces associated with the various sensors 400 (e.g., wired connections to a power supply, batteries for power storage, capacitive energy storage, etc.) may be housed within the central bore 397 of the housing 366. Therefore, unsightly cords, wires, etc. may be out of view, leaving only the sensor head 62 in view. In one embodiment, wires associated with a particular sensor 400 may be connected to the components pieces away from the sensor-mounting device 1. When the sensor 400 is installed, the wires and/or component pieces may be fed through the central bore 391 of the coupling 392 and into the central bore 397 of the housing 366. If a first sensor 400 is removed from the sensor-mount 1 (e.g., to replace it with another sensor), the wires and/or component pieces may be pulled back through the respective central bores 397 and 391, and the sensor 400 unhooked from the component pieces. The second sensor 400 may then be hooked to the component pieces, the wires and/or component pieces fed back through the respective central bores 391 and 397, and the sensor 400 secured into position with the sensor-mount 1 as described herein.

In one embodiment, certain electronics may be incorporated directly into the sensor head 362 thus allowing for increased versatility of the sensor 400. Here, the sensor head 362 may be equipped with electrical leads, such as metal or other conductive material pads. The electrical leads on the sensor head 362 may correspond to electrical leads on the coupling 392. The electrical leads on the coupling 392 may be wire connected to the battery 416 and other electrical components of the sensor 400 (e.g., microcontroller 410 and memory 414), which may be housed in the central bore 397 as discussed above. When the electrical leads on the sensor head 362 come into contact with the electrical leads on the coupling 392, the circuit may be completed. The sensor nodes 418 may be able to send information to the microcontroller 410 and memory 414, and the sensor 400 may receive power from the battery 416.

In this embodiment, the electrical components housed in the central bore 397 may be comprehensive. In other words, the circuitry required to utilize many different types of sensors 400 (and/or sensor nodes 418) may be readily available if the chosen sensor 400 has nodes 418 to take advantage of such functionality. Where the sensor 400 does not have a node 418 for certain functionality, that portion of the circuitry may simply stay dormant. For example, circuitry for a sensor 400 having nodes 418 to measure and/or detect light, temperature, humidity, and movement may be provided in the central bore 397. The circuitry may be connected, using methods known of skill in the art, to the electrical leads on the coupling 392. A sensor 400, however, may only have nodes 418 configured to measure light, temperature, and humidity. Therefore, the circuitry related to the detection of movement may simply remain available yet inactive. If a sensor 400 is later provided that has a node 418 for detecting movement, the circuitry related to such detection of movement may be utilized.

It shall be recognized that electrical leads may additionally (or alternately) be located in the sensor mounting device 1 and/or the locking ring 364. The electrical leads in each device may be configured to engage with electrical leads on the other respective device(s) in order to complete the circuit between the sensor nodes 418 and the required electrical circuitry stored in the central bore 397. The electrical leads may also be on the sensor 400 itself and the sensor head 362, such that the circuit is completed when the sensor head 362 is secured to the pipe fitting 366.

Embodiments of the sensor head 362 may have a variety of configurations.

Figure 14:
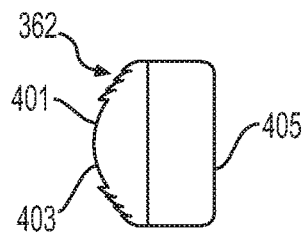
FIG. 14 is a side view of a sensor head in a first embodiment.
Figure 15:
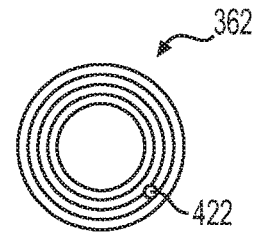
FIG. 15 is a front view of the sensor head of FIG. 14.

With reference now to FIGS. 14-15, the sensor head 362 is the face or cover of a sensor 400. The sensor head 362 connects or mates with the coupling 392 of the pipe fitting first end 393 to effectively seal the sensor within the pipe fitting 366. The sensor head 362 includes a first end 401 having a cap 403 and a second end 405 having a coupling means 363 (FIG. 12). In the illustrated embodiment, a male threaded portion 390 at first end 393 of the pipe fitting 366 is secured to the coupling means 363 at the second end 405 of the sensor head 362. In another embodiment, the sensor head 362 may have a "snap on" configuration, wherein the sensor head 362 is equipped with means for snapping into position with the mounting device 1, such as a bayonet mount which is well known in the art. The sensor head 362 may have release buttons for releasing the sensor head 362 from the "snapped" position with the mounting device 1. In still a further embodiment, the sensor head 362 may be configured for a quarter-turn or half-turn snap fit with the mounting device 1. Such methods of mounting are known in the art. In yet another embodiment, the sensor head 362 may be threaded, the threads on the sensor head 362 corresponding to threads in the mounting device 1. The sensor head 362 may thus be simply screwed into position with the mounting device 1. In still a further embodiment, the sensor head 362 may be magnetically coupled to the mounting device 1. The sensor head 362 and mounting device 1 may be equipped with corresponding magnets (e.g., rare earth magnets) which may be positioned and polarized in patters that allow for perfect positioning of the sensor head 362 within the mounting device 1. The force exerted in pulling the sensor head 362 away from the mounting device 1 must overcome the magnetic forces to remove the sensor head 362 from the mounting device 1. The sensor head 362 may optionally or alternately include other coupling means, such as male/female, elastic fit, cam, or other fastening means, whether now known or later developed.

The sensor head 362, and especially the cap 403, may form an ornate component of the sensor-mounting system 300. The cap 403 may be any geometrical shape (e.g., square, rectangular, oval, irregular, 3-dimensional (e.g., conical) et cetera) or any other desirable configuration. It may be designed to rest substantially flush with the mounting surface 2, or it may be raised. The cap 403 may be transparent, opaque, cosmetically designed (e.g., in color and in shape), and/or virtually invisible such that it blends with its surroundings. In this way, the sensor 400 may be specifically designed to be seen or not seen, depending on the preferences of the user.

Figure 20:
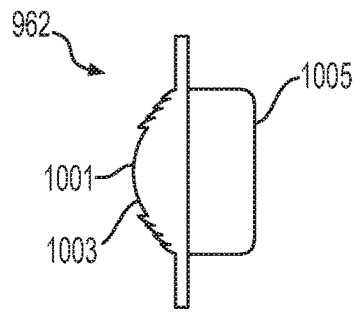
FIG. 20 is a side view of a sensor head in a fourth embodiment.

Further, the sensor head 362, optionally together with other portions of the system 300 (e.g., the locking ring 364 and/or the flange 24) may act as a component of other aesthetic pieces such as artistic renderings, pictures, or non-static displays, such as OLED, LED, LCD, et cetera. The cap 403 may cover the first end 393 of the pipe fitting 366 or may be as large to cover the front flange 24 of the sensor-mounting device 1 or any size thereof (FIG. 20). As noted herein, the sensor head 362 may have a Fresnel lens configuration. Also, as noted, the Fresnel lens may be utilized to capture more light or UV energy for charging a solar battery power source 416 and/or may be used for an infrared motion sensor.

The sensor head 362 may include at least one small pin hole 480 such that a small item (e.g., a paper clip) may be used to rotate the sensor head 362 into position. In some embodiments, the sensor head 362 may only require a quarter turn to be fully locked into place. Alternately, at least one of the first and second ends 401 and 405 may further include a nut configuration, so as to torque the sensor head 362 onto the pipe fitting 366.

Figure 16:
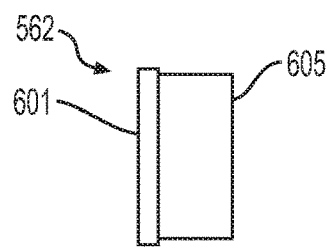
FIG. 16 is a side view of a sensor head in a second embodiment.
Figure 17:
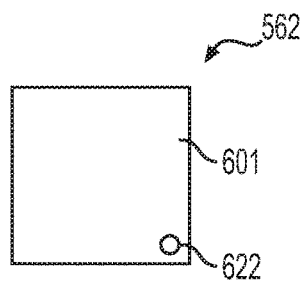
FIG. 17 is a front view of the sensor head of FIG. 16.
Figure 18:
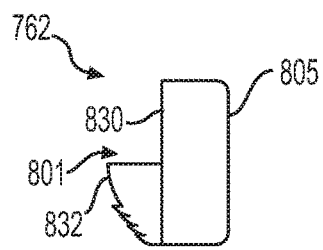
FIG. 18 is a side view of a sensor head in a third embodiment.
Figure 19:
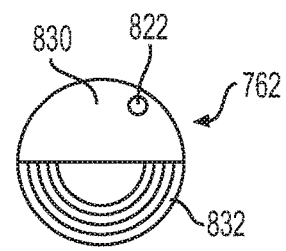
FIG. 19 is a front view of the sensor head of FIG. 18.
Figure 21:
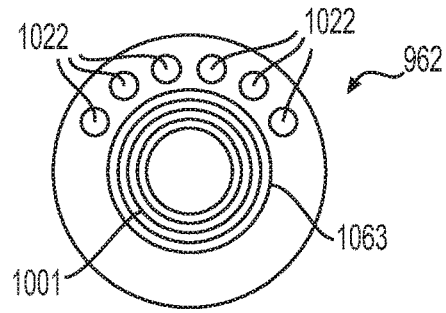
FIG. 21 is a front view of the sensor head of FIG. 20.

Additional embodiments of a sensor head are illustrated in FIGS. 16-21. Referring to FIGS. 16-17, a sensor head 562 has a square face 601 with one or more sensor apertures 622 into which a sensor node 618 may be situated. Referring now to FIGS. 18-19, a sensor head 762 has a split face 801 with an upper portion 830 having one or more sensor apertures 822 and a bottom portion 832 being a Fresnel lens. Referring to FIGS. 20-21, a sensor head 962 has a central Fresnel lens portion 1003, with sensor apertures 1022.

The sensor 400 may further include indicators that may also be situated within the sensor head, such as a light source (e.g., LED, electroluminescent lamp, LCD, oLED) or an audible alarm that is triggered once a particular activity is sensed (e.g., smoke, gas, magnetic, motion). Such indicators may be part of circuitry housed in the sensor head 362 and/or the housing 366. As noted above, the mating of the sensor head 362 with the coupling end 393 of the pipe fitting 366 may complete a circuit and power specific electronics housed in the sensor head 362 (e.g., transceiver 412, sensor node 418, light source, et cetera).

An important aspect in the development of a wireless sensor 400 is ensuring that there is adequate energy available to power the system. The sensor 400 consumes power for sensing, communicating, and data processing. More energy is required for data communication than any other process. In one embodiment, as noted above, the sensor mounting device 1 is installed during construction of the building (which may include construction that may occur after initial construction of the building is completed). Here, the sensor mounting device 1 may be hard wired to an electrical box, which may provide the sensor mounting device 1, and the sensor 400 (together the system 300), with the required energy for operation. Here, because the electrical box is available to provide power to the system 300, energy storage and/or energy conversion capabilities may not be required.

However, it may be beneficial for the system 300 to include means for storing power, both in situations in which the system 300 is hard wired to an electrical box, and where the system 300 receives its power from an outside source. Here, the power source 416 may be capacitors or a battery, such as NiCd (nickel-cadmium), NiZn (nickel-zinc), NIMH (nickel-metal hydride), or lithium-ion. The battery 416 may be configured to receive electrical energy from the electrical box during hours when rates may be lower due to lower demand, and then use the energy during the day, when rates may otherwise be higher. Alternately, or additionally, the battery 416 may store energy from other sources which may then be converted into electrical energy for use by the sensor 400.

For example, the sensor 400 may be able to capture solar energy through a photo-voltaic cell, which may be stored in the battery 416 according to methods known to those of skill in the art. The sensor 400 may further be equipped with light pipes, which may be partially situated within the pipe fitting 366, with at least a portion (e.g., a lens) having exposure to ambient or artificial light. Light pipes are well known in the industry, and are specifically known for transporting and/or distributing light. Any light pipe currently available or hereinafter made available may be utilized within the scope of the invention. Further, it shall be understood that the housing 366 may itself be a light pipe. Additionally, the light pipe functionality and/or other functional elements contained within the housing can be distributed or extended physically to connect to other housings or sensory/control devices throughout the system. Extension techniques for distributed sensing, power, and control could be realized by the use of fiber optic cables, wire cables, radio frequencies, sound, or visible light, for example.

The light pipe(s) may include a dome for collecting and reflecting as much light as possible into the tube. To optimize solar light, a heliostat may be installed so as to direct sunlight into the tube at all time. Further, the heliostat may allow the light pipe to capture light from the moon at night. Typically, light pipes direct light to another location which may have little to no access to natural light. Here, however, the light may be transferred through the light pipe to a photo-voltaic cell. Those of skill in the art shall recognize that reflective coatings on an inside surface of the light pipe(s) may be beneficial for maximizing the energy harvesting potential.

Figure 22:
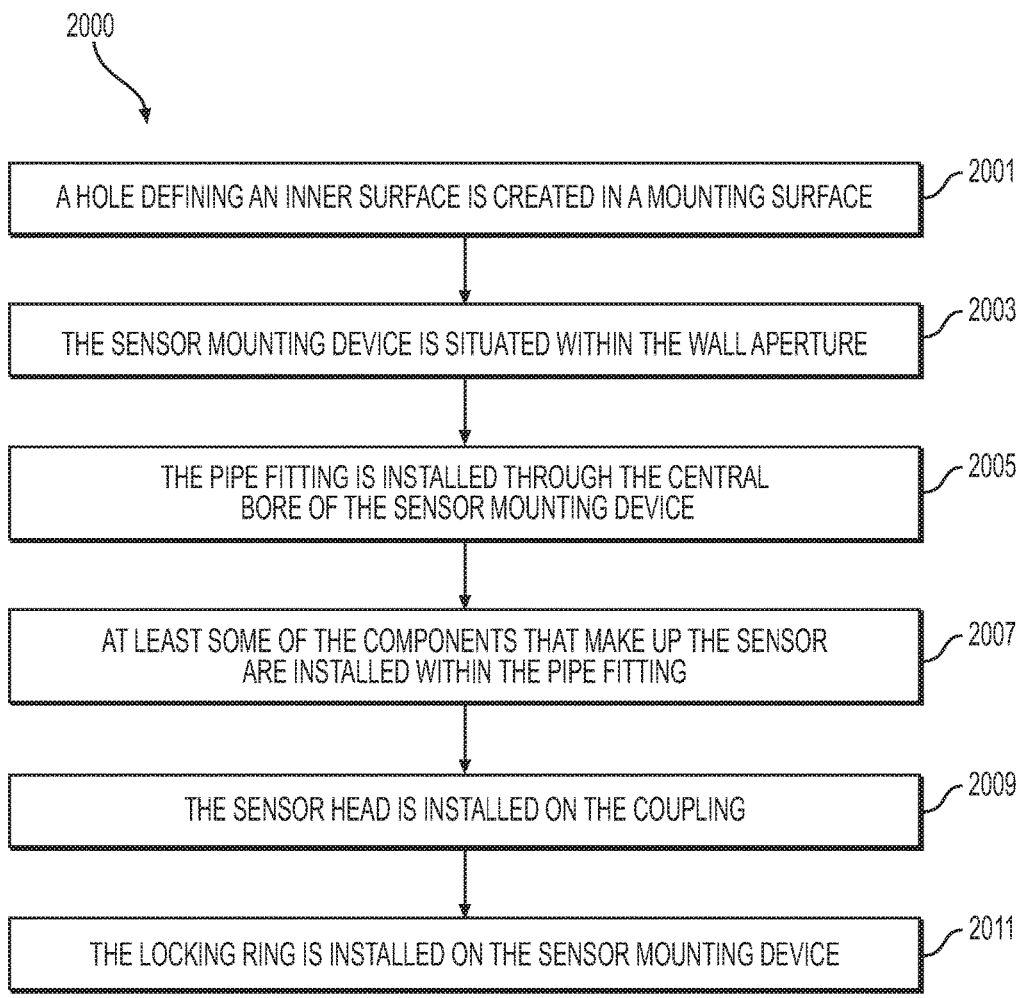
FIG. 22 is a flow diagram of a method of installing the modular sensor-mounting system of FIG. 11 according to an embodiment of the present disclosure.

Referring to FIG. 22, a method 2000 of installing a sensor-mounting system 300 is illustrated. In this method, only the method as it pertains to the sensor-mounting device 1 is disclosed, but it is foreseen that the steps for the other embodiments of the sensor-mounting devices 101, 201 would be similar. In step 2001, a hole 5 (FIG. 11) defining an inner surface 6 is created in the mounting structure 2. In step 2003, the sensor-mounting device 1 is situated within the wall aperture 5. In this step, the first end 14 is inserted through the aperture 5 (e.g., by compressing the upper and lower portions 13 and 15 of the body 10), such that the body 10 of the sensor-mounting device 1 engages with the inner surface 6 of the mounting structure 2. The flange 16 engages the back surface 4 of the mounting structure 2.

In step 2005, the pipe fitting 366 is installed through the central bore 11 of the sensor-mounting device 1. In this step, the second end 395 of the pipe fitting 366 is inserted through the central bore 11 of the sensor-mounting device 1 until the circular plate 396 engages the stop surface 28 of the sensor-mounting device 1. It shall be recognized that the end cap 394 is small enough to pass through the central bore 11. At least the inner portion of the sensor-mounting device 1 may be made from an elastic material, as this may allow for easier manipulation or even widening of the central bore 11 as the pipe fitting 366 is passed through.

In step 2007, at least some of the components that make up the sensor 400 are installed within the pipe fitting 366. The components pass through the central bore 391 of the coupling 392 and into the central bore 397 of the pipe fitting 366; therefore the electronics are sized and shaped to be elongate and small enough to fit through these bores. If at least some of the components of the sensor 400 are housed in the sensor head 362, then wiring or other electrical connecting means may be exposed until after the sensor head 362 is installed.

In step 2009, the sensor head 362 is installed on the coupling 392. In some embodiments, the sensor head 362 may require a quarter-turn rotation to install. Electronic connecting means may fully connect and complete the circuit to communicate with at least some of the components of the sensor 400, such as the microcontroller 410, memory 414, a power source 416, et cetera.

In step 2011, the locking ring 364 is installed on the sensor-mounting device 1. The locking ring 364 is sized and shaped so as to easily mate within the recess 65 created by the projections 30, 40 and/or the recess 390 mates with the projection 40 and captures the sensor head 362 and the pipe fitting 366 within the sensor-mounting device 1.

Further steps of the method 2000 may include mudding and/or taping over the first flange 16 of the sensor-mounting device to hide the flange 16 from view. It shall be understood, however, that the flange 16 may provide an aesthetic. Various steps of the method 2000 may be performed out of the sequenced disclosed above.

Figure 25:
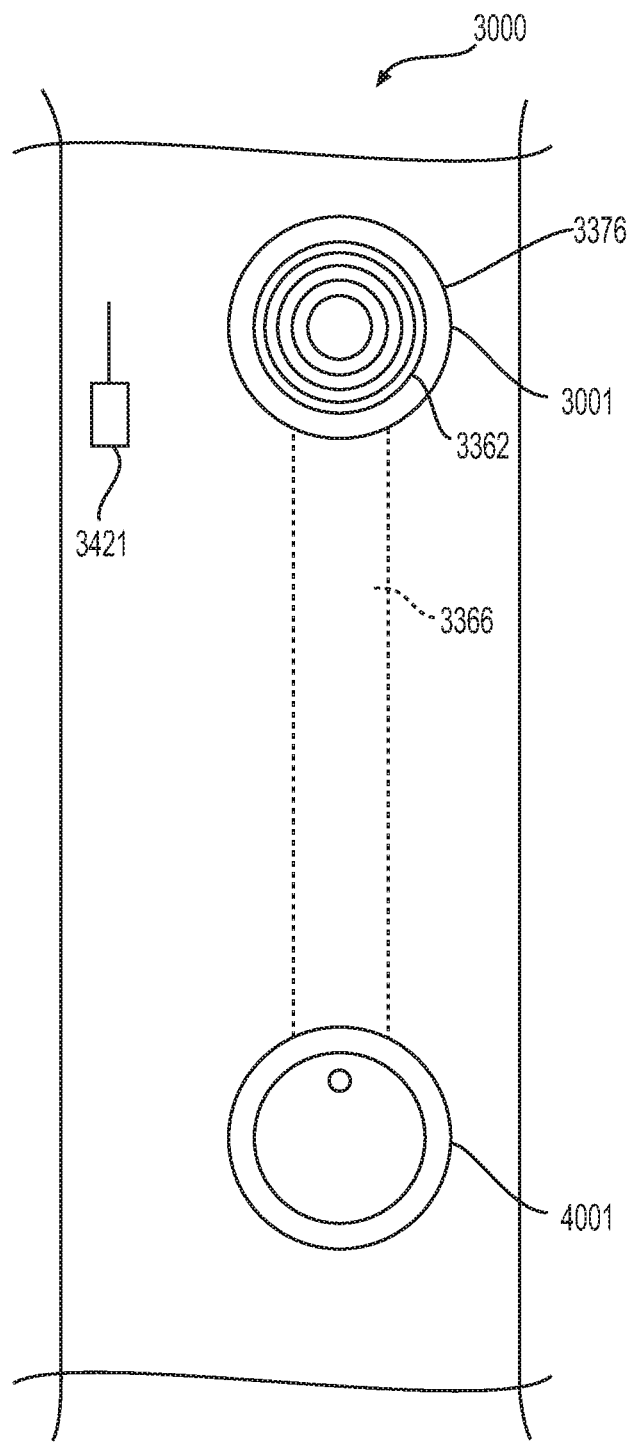
FIG. 25 is a front view of the modular sensor-mounting system of FIG. 23 in use within a wall.

The systems and methods described herein may be further embodied in other configurations. Referring now to FIGS. 23-25, an alternate sensor-mounting system 3000 is illustrated. The sensor-mounting system 3000 includes a first sensor-mounting assembly 3001 and a second sensor-mounting assembly 4001. Each of the sensor-mounting assemblies 3001, 4001 is substantially similar to the sensor-mounting system 300, with the exception that the second end 3395 of the pipe fitting 3366 ends at the first end 4393 of the second sensor-mounting assembly 4001.

The second mounting system 4001 may be fed through a first hole in the mounting structure 3002 such that the first sensor-mounting system 3001 may be installed into the mounting structure 3002. The second mounting system 4001 may then exit through a second hole in the mounting structure 3002, as shown in FIGS. 23-25. The length of the pipe fitting 3366 will determine where the second hole (and thus the second sensor-mounting assembly 4001) should be located. The length of the pipe fitting 3366 may be comprised of one pipe or several pipes coupled together. It shall thus be understood by those of skill in the art that the pipe fittings 366, 3366, etc. may be lengthened to accommodate additional components therein (e.g., batteries, computer components, etc.).

Figure 26:
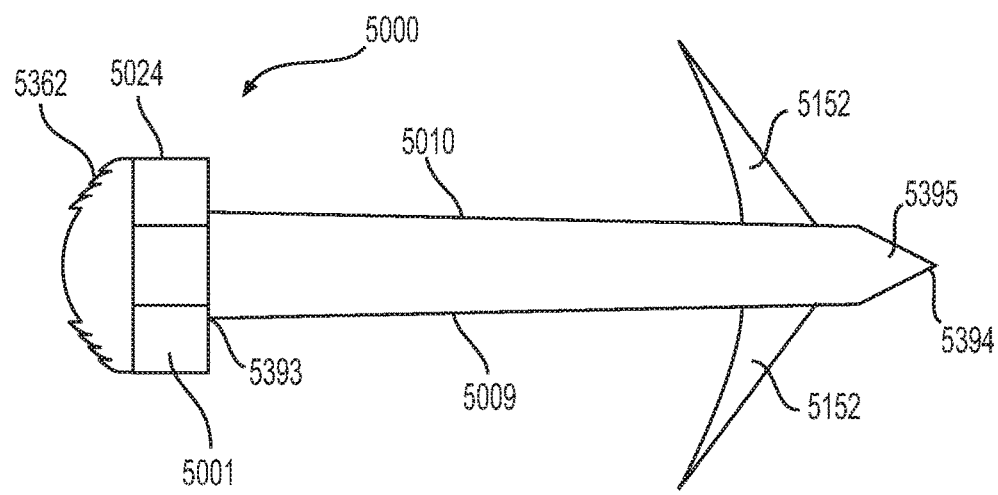
FIG. 26 is a side view of a modular sensor-mounting system in a third embodiment according to the present disclosure.
Figure 27:
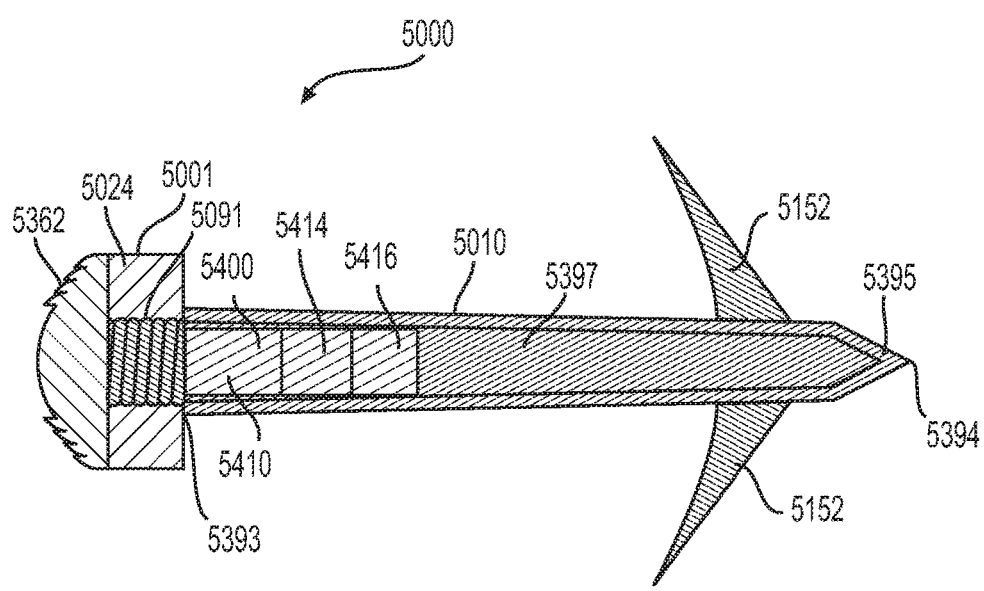
FIG. 27 is a cross section view of the modular sensor-mounting system of FIG. 26.

With reference now to FIGS. 26-27, still another sensor-mounting system 5000 is illustrated. The sensor-mounting system 5000 includes a sensor 5400, a sensor head 5362, and a sensor-mounting device 5001. The modular sensor 5400 is substantially similar to the sensor 400 discussed above. The sensor-mounting device 5001 has a driving head 5024 and a body 5010 with a first end 5393 and a second end 5395. The driving head is located at the first end 5393. The sensor-mounting device 5001 may be made from one or more materials including but not limited to metal (e.g., aluminum, brass, copper, steel, tin, nickel, titanium, et cetera), plastic (e.g., bakelite, polystyrene, polyvinyl, nylon, et cetera), rubber (synthetic or natural), or other appropriate materials.

The body 5010 is hollow, creating a recess 5397 to allow for components of the sensor 5400 to be housed therein. The body 5010 has an outer surface 5009 with a tip 5394 at the second end 5395. The tip 5394 is configured for driving into a mounting structure. On the outer surface may be at least one wing 5152. The wings 5152 may adjust from zero degrees to substantially ninety degrees, or at least may be initially substantially flat or flush against an outer surface 5009 of the body 5010 and subsequently spread as illustrated. It may be particularly important that the wings 5152 open up only once installed inside the mounting structure, bracing the sensor-mounting device 5001 against a back surface of the mounting structure to hold the device securely. To this end, the wings 5152 may be spring loaded, such that once the wings 5152 pass through the back surface of the wall, they may spring open. The body 5010 may be sufficiently long to allow the wings 5152 to catch against the back surface of the mounting structure. The wings 5152 are illustrated as substantially similar to each other, though the wings 5152 may not be the same size or shape. In other embodiments, the outer surface 5009 of the body 5010 may include coarse threads to interact with the mounting structure 2, either in combination with the wings 5152 or in lieu of them.

The driving head 5024 may be hexagonally shaped to allow traditional wrenches to torque the sensor-mounting device 5001 into the mounting structure 2. The driving head 5024 may also (or instead) include a central bore 5091 that may be used as a coupling means for the sensor head 5362. In other embodiments, a blunt force instrument may be used to drive the sensor-mounting device 5001 into the mounting structure 2. The body may be driven into the mounting surface or inserted into a hole in the mounting surface.

The sensor head 5362 is the face or cover of a sensor 5400 that connects or mates with the coupling 5091 of the driving head 5024, and may be substantially similar to the sensor head 362. The sensor head 5362 may be secured to the body 5010 via methods described above regarding the sensor head 362.

Referring now to FIGS. 28-29, still yet another sensor-mounting system 6000 is illustrated. The sensor-mounting system 6000 includes a sensor 6400, a sensor head 6362, and a sensor-mounting device 6001. The modular sensor 6400 and the sensor head 6362 are substantially similar to the corresponding parts, sensor 400 and sensor head 362, discussed above, except as shown and described. Here, the body 6010 has an outer surface 6009 with a tip 6394 at the second end 6395 for being driving into a ground 6002.

The driving head 6024 is located at the first end 6393. The driving head 6024 may be hexagonally shaped to allow wrenching devices to torque the sensor-mounting device 6001 into the ground 6002. And a blunt force instrument may also, or alternately, be used to drive the sensor-mounting device 6001 into the ground 6002. The driving head 6024 may include a central bore 6391 and may be used as a coupling means for the sensor head 5362.

The driving head 6024 includes a coupling 6392, such as a liquid-tight coupling on the first end 6393, and the coupling 6392 has a threaded portion 6390. The coupling 6392 further has a central bore 6391 that may be smaller than the recess 6397 of the body 6010 of the sensor-mounting device 6001. The coupling 6392 is sealed by the sensor head 6362, which is illustrated to have a female coupling portion 6363 that is sized and shaped to mate with the threaded portion 6390.

The system 6000 (and/or other embodiments described herein) may be specifically configured for use in outdoor environments. For example, as noted above, the coupling 6392 may be water-proof to protect the circuitry components stored in the housing 6010. The sensors may include nodes for measuring temperature, receiving and storing energy such as solar energy. The system 6000 may be in communication with other systems of a structure, building, or home near where the system 6000 is placed for the purposes of providing controlled responses. For example, the system 6000 (via sensors) may be in communication with the HVAC system within a building for controlling the temperature, humidity, etc. inside the building based on the information from the system 6000.

Additionally, various embodiments of sensor mounting systems identical or similar to those described herein may be adapted for other uses in addition to those described herein. For example, one or more sensor mounting systems may be configured for implementation on a roof of a building. Here, those of skill in the art will appreciate that various components may be designed to be waterproof and/or to dissipate heat, among other features, in order to handle the potentially harsh environment in which the sensor may be placed. In another example, one or more sensing mounting systems may be configured for placement in concrete (e.g., sidewalk, roadways, etc.) The sensor mounting system may thus be configured to withstand compression and expansion of a concrete environment. The sensor mounting system incorporated into a concrete may be particularly useful, in some embodiments, as a self-charging (e.g., using solar power) light, similar to those available on the market today. Here, the sensor may incorporate means for receiving and storing solar energy, as described above, as well as various lighting capabilities for transmitting light (e.g., when the sensor determines that such light is desirable. Further implementations of the various sensor mounting devices shall be understood to be within the scope of the invention. In still another embodiment, a sensor mounting system may be incorporated into specific products (e.g., as a retrofit) including but not limited to window frames, window sashes, hollow doors, door frames, skylights, or any other surface reasonably configured to house such a device.

Many different arrangements of the various components depicted, as well as components not shown, are possible without departing from the spirit and scope of the present invention. Embodiments of the present invention have been described with the intent to be illustrative rather than restrictive. Alternate embodiments will become apparent to those skilled in the art that do not depart from its scope. A skilled artisan may develop alternate means of implementing the aforementioned improvements without departing from the scope of the present invention. Further, it will be understood that certain features and subcombinations may be of utility and may be employed without reference to other features and subcombinations and are contemplated within the scope of the claims.

The invention claimed is:

1. A sensor-mounting device for use with a mounting structure having a hole, the device comprising:
   a tubular body extending between a front end and terminating at a rear end, and a through hole defined within the tubular body, the tubular body being sized to pass through the mounting structure hole;
   a front flange extending from the tubular body front end, an outside perimeter of the front flange being larger than a perimeter of the tubular body for positioning at a front face of the mounting structure;
   a rear flange extending from the tubular body rear end, an outside perimeter of the rear flange being smaller than the outside perimeter of the front flange and larger than the perimeter of the tubular body for positioning at a back face of the mounting structure; and
   a sensor-attachment structure located at an inside perimeter of the front flange.

2. The sensor-mounting device of claim 1, wherein the tubular body includes at least one expansion groove extending to the tubular body rear end, allowing a perimeter of the tubular body at the tubular body rear end to be selectively decreased and increased.

3. The sensor-mounting device of claim 1, wherein the tubular body is generally circular in cross section.

4. The sensor-mounting device of claim 1, wherein the sensor-attachment structure includes threading.

5. The sensor-mounting device of claim 1, wherein the inside perimeter of the front flange further defines a seat for receiving a lip of a coupling device.

6. The sensor-mounting device of claim 5, wherein the coupling device is a pipe coupling having forward and rearward ends, the lip being disposed at the forward end, and a through hole extending between the forward and rearward ends.

7. The sensor-mounting device of claim 6, wherein the sensor-attachment structure includes one of threading and a bayonet mount for mating with a locking ring.

8. The sensor-mounting device of claim 7, wherein the pipe coupling rearward end has a coupler, and further comprising a piece of conduit affixed to the pipe coupling rearward end by the coupler.

9. The sensor-mounting device of claim 8, wherein the pipe coupling through hole is not linear.

10. The sensor-mounting device of claim 1, further comprising a sensor having at least one sensor node and a transceiver, the transceiver configured to transmit data from the sensor node over a network, the sensor being operatively coupled to the sensor-attachment structure.

11. The sensor-mounting device of claim 10, wherein the sensor has a sensor head having an ornate end and a hollow recess formed therein.

12. The sensor-mounting device of claim 11, wherein at least one of the sensor node and the transceiver are located in the sensor head recess.

13. The sensor-mounting device of claim 10, wherein, when the sensor is operatively coupled to the sensor-attachment structure, the sensor circuit is connected.

14. The sensor-mounting device of claim 1, further comprising a light sensor attached to the sensor-attachment structure.

15. The sensor-mounting device of claim 1, further comprising a sound sensor attached to the sensor-attachment structure.

16. The sensor-mounting device of claim 1, further comprising a smoke sensor attached to the sensor-attachment structure.

17. A method of installing a sensor-mounting device for use with a generally vertical piece of sheetrock, comprising positioning the sensor-mounting device within an aperture formed in the generally vertical piece of sheetrock, the aperture having a generally horizontal axis, wherein the sensor-mounting device comprises:
  a tubular body extending between a front end and terminating at a rear end, the tubular body defining a through hole extending between the front and rear ends, the tubular body being sized to pass through the sheetrock aperture;
  a front flange extending from the tubular body front end, an outside perimeter of the front flange being larger than a perimeter of the tubular body for positioning at a front face of the sheetrock;
  a rear flange extending from the tubular body rear end, an outside perimeter of the rear flange being smaller than the outside perimeter of the front flange; and
  a sensor-attachment structure located at an inside perimeter of the front flange.

18. The method of claim 17, further comprising securing a pipe coupling to the tubular body, the pipe coupling comprising respective forward and rearward ends, a through hole extending between the forward and rearward end, and a piece of conduit affixed to the coupling rearward end.

19. The method of claim 18, further comprising positioning a sensor within the through hole of the pipe coupling.

20. The method of claim 19, further comprising removably fixing a sensor head on the forward end of the pipe coupling, wherein the sensor head has an ornate end with a hollow recess formed therein, and a coupling end, and wherein the coupling end mates with the forward end of the pipe coupling.

21. The method of claim 20, further comprising removably securing a locking ring over the sensor head, the locking ring engaging with at least one of the sensor head and the forward end of the pipe coupling, wherein the sensor head and the forward end are situated within a central bore defined in the locking ring.

22. A sensor-mounting device, the device comprising:
  a tubular body extending between a front end and a rear end and a through hole defined by the tubular body between the front and rear ends;
  a front flange extending from the tubular body front end, an outside perimeter of the front flange being larger than a perimeter of the tubular body;
  a rear flange at the tubular body rear end, an outside perimeter of the rear flange being smaller than the outside perimeter of the front flange; and
  a sensor-attachment structure located at an inside perimeter of the front flange.

23. The sensor-mounting device of claim 22, further comprising a tip for piercing a ground surface, the tubular body rear end being located between the tubular body front end and the tip.

24. A sensor-mounting device, the device comprising:
  a conduit extending between a first end and a second end, the first and second end each comprising a tubular body for attachment to the conduit, each of the tubular bodies comprising;
    a front flange extending from a first end of the tubular body and a rear flange extending from a terminal second end of the tubular body, a perimeter of each the flanges being larger than a perimeter of the tubular body and the perimeter of the front flange being larger than the perimeter of the rear flange; and
    a sensor-attachment structure located on an inside face of the front flange; and
  wherein:
    the first and second ends of the conduit are received into the respective tubular bodies; and
    the respective front and rear flanges of the tubular bodies engage with respective apertures formed in a mounting surface, wherein the front and rear flanges together maintain the tubular bodies in position at the mounting surface.

* * * * *